(12) United States Patent  
Simpson

(10) Patent No.: US 6,283,076 B1  
(45) Date of Patent: Sep. 4, 2001

(54) TORSIONALLY COMPLIANT SPROCKET FOR ENGINE BALANCE SHAFT DRIVE AND METHOD OF MANUFACTURE

(75) Inventor: Roger T. Simpson, Ithaca, NY (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/591,351

(22) Filed: Jun. 9, 2000

(51) Int. Cl.[7] ....................................... F01L 1/02
(52) U.S. Cl. ..................... 123/90.31; 123/192.1; 123/192.2; 74/574; 474/94; 464/180
(58) Field of Search ............... 123/90.31, 192.1, 123/192.2; 74/574, 573 R, 443, 440, 441; 474/93, 903; 464/180

(56) References Cited

U.S. PATENT DOCUMENTS

| | | |
|---|---|---|
| 1,254,542 | 1/1918 | Schwinn . |
| 1,518,360 | 12/1924 | Royce . |
| 3,991,818 * | 11/1976 | Wagner ................................ 165/8 |
| 4,139,995 * | 2/1979 | Lamarche ............................ 464/64 |
| 4,197,759 * | 4/1980 | Krebs et al. ........................ 74/447 |
| 4,317,388 * | 3/1982 | Wojcikowski ...................... 74/574 |
| 5,308,289 | 5/1994 | Funahashi .......................... 474/94 |
| 5,427,580 | 6/1995 | Ledvina et al. .................... 474/84 |
| 5,560,267 | 10/1996 | Todd et al. ........................ 74/604 |
| 5,579,665 | 12/1996 | Mott et al. ........................ 74/574 |
| 5,619,887 | 4/1997 | Simpson ............................ 74/574 |
| 5,655,416 * | 8/1997 | Mott et al. ........................ 74/574 |
| 5,908,095 * | 6/1999 | Jackel ............................. 192/90.17 |
| 6,161,512 * | 12/2000 | Beels Van Heemstede ...... 123/90.31 |

* cited by examiner

Primary Examiner—Weilun Lo
(74) Attorney, Agent, or Firm—Sidley & Austin; Greg Dziegielewski

(57) ABSTRACT

The present invention relates to a torsionally compliant sprocket system which absorbs crankshaft torsional vibrations and minimizes their transfer to other components in the engine system. In particular, the present invention includes a sprocket formed with an elastomeric member located between hub and rim portions. The hub has splines which cooperatively engage with keyways formed in the rim portion through the elastomeric member. A method of forming the compliant sprocket includes forming the hub and rim portions and injection molding an elastomeric material into a gap between the hub and rim portions. While in the mold, heat is applied to the sprocket assembly. The elastomeric member is thus vulcanized in place, creating a one-piece compliant sprocket.

7 Claims, 3 Drawing Sheets

TORSIONALLY COMPLIANT SPROCKET FOR ENGINE BALANCE SHAFT DRIVE AND METHOD OF MANUFACTURE

Reference is made to U.S. application Ser. No. 09/154,814, filed Sep. 17, 1998, now U.S. Pat. No. 6,109,227, entitled "Torsionally Compliant Sprocket System for Balance Shaft Drive", and U.S. application Ser. No. 09/392,657, filed Sep. 9, 1999, entitled "Torsionally Compliant System with Damped Sprocket System with Position Stops", the subject matter of which relates to the present invention and is incorporated herein by reference.

BACKGROUND OF THE INVENTION

This invention relates to the reduction of vibrations in engine balance shaft drives. This invention has particular application to engine timing and balance drive systems driven by sprockets located on a rotating crankshaft. More particularly, the invention relates to a torsionally compliant sprocket for absorbing torsional loads and vibrations in a balance shaft drive system originating from a driving shaft.

Engine timing systems typically include an endless chain wrapped around a driving sprocket on an engine crankshaft and a driven sprocket on an engine camshaft. The rotation of the crankshaft causes the rotation of the camshaft through the endless chain system. A separate sprocket mounted upon the crankshaft may be used to drive a balance shaft system using a separate endless chain.

More complicated engine timing systems connect the crankshaft with two or more shafts by a pair of chains. The crankshaft includes two sprockets. Each chain is connected to one or more driven sprockets, including sprockets on each of the two overhead camshafts. Typically, the chain systems in more complicated engine timing systems will include tensioners on the slack side of each chain to maintain chain tension and snubbers on the tight side of each chain to control chain movement during operation.

Some engine timing systems have two (or dual) overhead camshafts for each bank of cylinders. The dual camshafts on a single bank can both be rotated by connection to the same chain. Alternatively, the second camshaft can be rotated by an additional camshaft-to-camshaft chain drive. The cam-to-cam drive chain can also include single or dual tensioners for chain control.

In some engine timing systems, especially those having a nonconventional firing order for the cylinders and those used in diesel engines, balance shafts are employed to counterbalance engine vibration. The balance shafts are driven by a chain connection from the crankshaft. Optionally, the balance shaft drive system may be utilized to operate an auxiliary drive such as a compressor or the like. The balance shafts are driven by the crankshaft and as a consequence, torsional vibrations and oscillations along the crankshaft may be transferred to the balance shafts and likewise throughout the timing system. Since balance shafts employ rotating weights, they are rotating systems having a high mass and inertia.

The rotating crankshaft may undergo resonance at certain frequencies. Since the balance shafts are coupled to the crankshaft by the balance shaft chain, the balance shafts are directly exposed to these extreme resonant torsional vibrations. The vibrations can cause high loads on the chain system for the balance shaft drive because of the high inertia of the balance shafts. Vibrations from the resonance of the crankshaft are often transferred throughout the system, including the balance shafts and associated engine elements and can significantly increase the load on the systems and components, increase the noise from the engine and increase wear and accelerate fatigue of the chains.

Some prior art timing systems use various damping devices to address the problem of vibrations. One example of such a prior art system uses a rubber damper piece which is placed against a sprocket and bolted to the shaft to absorb vibrations. However, the rubber damper piece may fracture from the extreme resonance vibrations. Other timing systems employ a weight that is positioned on the shaft and held against the sprocket by a Belleville washer. Frictional material is also placed at the area of contact between the sprocket and the weight. These systems, while effective at damping vibrations have drawbacks in terms of production, assembly and durability.

By contrast, the present invention focuses on absorbing the torsional vibrations of a crankshaft using a torsionally compliant sprocket. The torsionally compliant sprocket reduces the transfer of such vibrations and torque spikes to other parts of the engine system. The torsionally compliant sprocket interposes a resilient elastomeric layer between a hub portion and a sprocket rim portion of a driving sprocket mounted on the crankshaft to absorb vibrations and reduce transfer of the crankshaft vibrations.

SUMMARY OF THE INVENTION

On engines equipped with balance shafts, an endless chain connects a driving sprocket on the crankshaft to driven sprockets on balance shafts. The rotation of the driving sprocket advances the chain, which turns the driven sprocket and the shaft. Torsional vibrations occur during system operations and may be exceptionally severe at resonance conditions. To reduce these vibrations and to reduce the transfer of these vibrations from the crankshaft to other portions of the engine, the present invention provides a torsionally compliant arrangement of the balance shaft sprocket. By interposing an elastomeric element in the crank sprocket vibrations originating in the crankshaft are, to a significant extent, effectively prevented from being transmitted to the remainder of the balance shaft chain drive. This results in lower chain load, an increase in chain life and a system that can be optimized for cost rather than robustness.

In a first embodiment, the torsionally compliant sprocket comprises a hub portion securely mounted upon the crankshaft. The outer periphery of the hub portion has a plurality of extending splines formed thereon which project radially outwardly from the hub member. A sprocket rim portion having teeth formed on its outer periphery for engaging a chain is provided about the hub portion. Keyways on an inner surface of the sprocket rim portion are arranged to engage in a cooperative manner with the splines of the hub. Molded into the space between the splines of the hub and the keyways of the sprocket rim is an elastomeric material capable of absorbing torsional vibrations and providing beneficial damping.

Machined washers are provided on either side of the sprocket to maintain alignment of the hub and rim portions. The washers are either splined onto the crankshaft or may be freely rotatable about the crankshaft. One of the washers may be spring loaded to apply force to the sprocket but still allows the outer rim portion of the sprocket to move with respect to the inner hub portion. Preferably, the washers have a predetermined amount of clearance from the compliant sprocket. The clearance allows the elastomeric material in the sprocket to bulge out of the sprocket when compressed but still prevent the sprocket from becoming misaligned with the driven sprockets.

Stop blocks are optionally provided between the hub and the sprocket rim portions of the balance shaft drive sprocket to prevent damage to the elastomeric material. The stop blocks are formed on the side faces of the hub splines or formed on the inner faces of the sprocket rim keyways or on both. Engagement of the stop blocks prevent overrotation of the sprocket rim portion with respect to the hub portion when the drive sprocket rotates more than a predetermined amount.

When the system is excited at its natural frequency, large amplitudes of torsional oscillation may be generated, which tends to negate the effectiveness of the compliant sprocket. In this case, the resonant vibrations tend to have a broad frequency range. It is preferable that the natural frequency of the compliant material in the sprocket is less than the idle speed of the engine. Accordingly, it has been found that the compliant sprocket benefits by the addition of a damping mechanism.

Damping is provided to the torsionally compliant sprocket system. While many methods of adding damping to the system would be effective, the preferred method is to use the natural damping factor of the rubber elastomer itself When using a rubber elastomeric member as the compliant and damping aspect of the compliant sprocket, it is expected that no additional damping mechanism will be necessary. The rubber elastomeric insert is used to add sufficient damping to eliminate the issues associated with natural frequency oscillations, while still maintaining the required compliance in the system. Computer modeling, bench testing and engine testing of similar systems have all shown that damping is generally required to minimize the large oscillations of the compliant sprocket due to system resonance and is provided effectively by an elastomeric member.

In a second embodiment, the present invention includes a torsionally compliant sprocket having a rim portion formed of an offset sprocket plate mounted to the edge of a sleeve portion. The sleeve portion is located about the elastomeric portion and the hub.

The present invention includes methods of manufacturing a compliant sprocket. A first embodiment includes injection molding a rubber elastomeric material between a hub and a rim portion of the sprocket. In a second embodiment, the elastomeric member is preformed and assembled between the hub and the rim portions of the sprocket.

For a more complete understanding of the invention, one should refer to the embodiments illustrated in greater detail in the drawings and described below by way of examples of the invention.

DETAILED DESCRIPTION OF THE PREFERRED EMBODIMENTS

Figure 1:
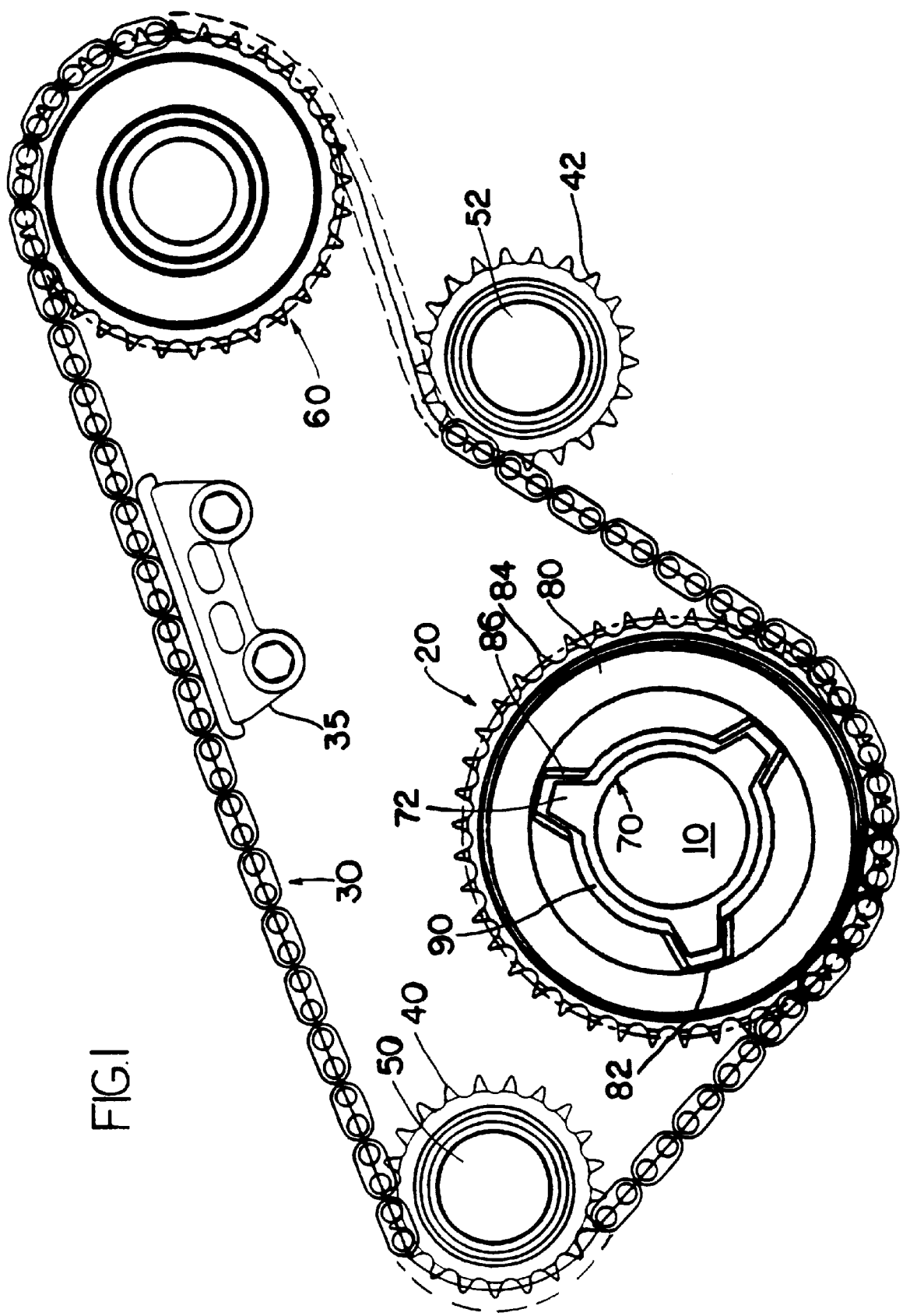
FIG. 1 is schematic view of a balance shaft drive portion of an engine which incorporates the torsionally compliant sprocket of the present invention.

The torsionally compliant sprocket of the present invention is used in a balance shaft drive system, which is schematically illustrated in FIG. 1. Crankshaft 10 provides power output through compliant sprocket shown generally at 20. A chain 30 wraps around the compliant sprocket 20 to drivingly connect the crankshaft 10 to a first balance shaft sprocket 40 and a second balance shaft sprocket 42. Each balance shaft sprocket (40,42) is connected to a balance shaft 50, 52. The balance shafts 50,52 are designed to turn in opposite directions. Thus, an idler gear 60 is used which causes to chain to travel over one of the balance shaft sprockets in such a manner as to cause the other balance shaft sprocket to spin in the opposite direction. In other words, one balance sprocket will turn in a clockwise direction and the remaining balance shaft sprocket will turn in a counterclockwise direction.

Compliant sprocket 20 includes a hub portion 70 which is secured to the crankshaft 10. The hub 70 is secured to the crankshaft 10 using splines and keyways (not shown) or welding or any other suitable means known in the art. The hub portion 70 has a general cylindrical sleeve shape. A plurality of radially extending spokes 72, teeth or splines are spaced about the periphery of the hub 70.

Centered about the outside of the hub portion is a rim portion 80 of the compliant sprocket 20. The rim portion 80 has keyways 80 or housings formed to cooperate with the splines 72 on the hub portion 70. Teeth 84 are formed on the periphery of the rim portion 80 to engage the chain 30. Stops 86 are formed on the inner surface of the keyways 82 adjacent the front and back sides of the hub splines 72. When the rim 80 rotates with respect to the hub 70 the stops 86 contact the sides of the hub splines 72 and prevent over rotation and possible damage to the sprocket.

Between the hub 70 and rim portions 80 of the sprocket 20 is an elastomeric member 90. The elastomeric member 90 provides the sprocket 20 with vibration absorption and damping properties.

The chain and sprocket system shown in FIG. 1 may utilize conventional snubbers and tensioning devices (an example shown as element 35) to maintain tension and lateral control in various portions of the chain drive. Typically tensioners are used on a slack strand of the chain and snubbers are used along the tight strand of the chain. Such devices are known to those skilled in the chain art.

Figure 2:
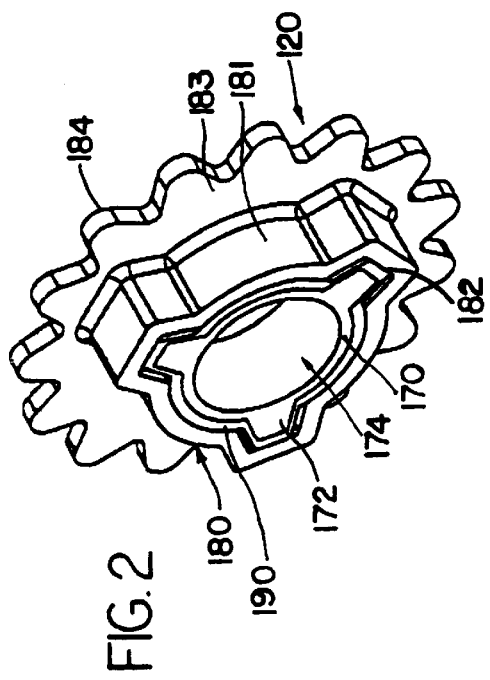
FIG. 2 is a perspective view of an embodiment of the sprocket of the present invention having an offset sprocket rim portion.
Figure 4:
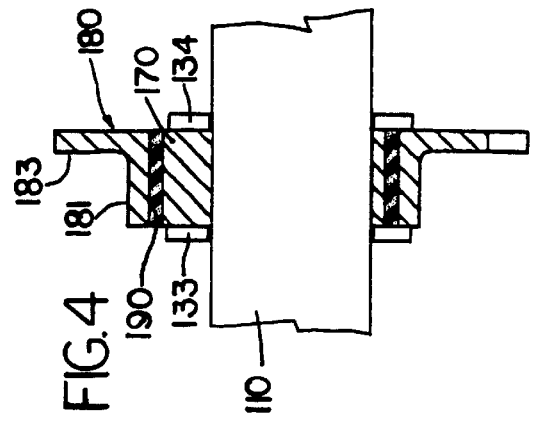
FIG. 4 is a cross-sectional view of the sprocket of FIG. 3 along lines 4—4.
Figure 3:
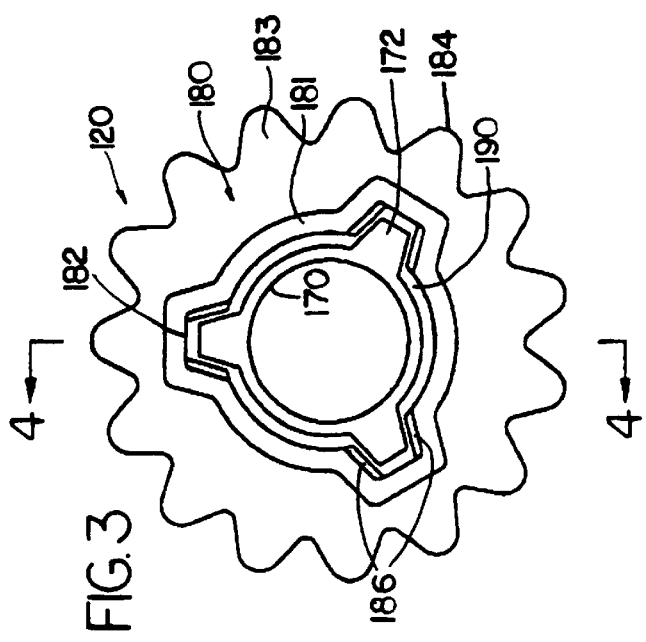
FIG. 3 is a side view of the sprocket of FIG. 2.

FIGS. 2 through 7 illustrate, in more detail, two embodiments of the torsionally compliant sprocket of the present invention. Referring to the drawings, FIGS. 2 through 4 show various views of a first embodiment of the sprocket of the present invention. The hub member 170 is located at the center of the sprocket 120. The hub member 170 has a central bore 174 for positioning the sprocket 120 on the crankshaft 110. Extending in an radially outward direction are splines 172 which generally have a toothed or triangular shape. Any shape tooth which is capable of transmitting force to a corresponding keyway can be used on the hub.

In this embodiment, the rim portion 180 consists of two parts. A sleeve 181 which is located about the periphery of the hub 170 has a generally cylindrical form which essentially wraps around the hub. The keyways 182 formed in the sleeve 181 of the rim portion 180 cooperate with the hub splines 172 so that the extending splines fit into the recessed keyways. At one end of the sleeve a toothed portion 183 is secured. The toothed portion 183 has a flat plate-like form and spaced teeth 184 formed on the periphery. The sleeve 181 and toothed portions 183 together form the rim portion 180 of the sprocket 120.

Between the hub portion 170 and the rim portion 180 is elastomeric member 190. The elastomeric member 190 absorbs and damps vibrations originating in the crankshaft 110 and reduces the transfer of the vibrations to the rim portion 180 of the sprocket, and thus, the remainder of the drive system.

Washers 133, 134 are placed on the crankshaft. Washer 133 is located in front of the sprocket 120 and washer 134 is located at the rear of the A compliant sprocket 120. The washers maintain alignment of the compliant sprocket with respect to the sprockets mounted on the balance shafts and also maintain alignment of the rim portion of the compliant sprocket with respect to the hub portion.

Position stops 186 are formed on both sides of the keyways 182 along the inner surface of the sleeve portion 181. They are adapted to engage corresponding adjacent surfaces formed on the splines 172 of the hub 170 when the rim portion 180 moves clockwise or counter clockwise a predetermined amount with respect to the hub portion of the sprocket. This prevents over rotation of the sprocket and reduces the possibility of damage to the sprocket.

Figure 5:
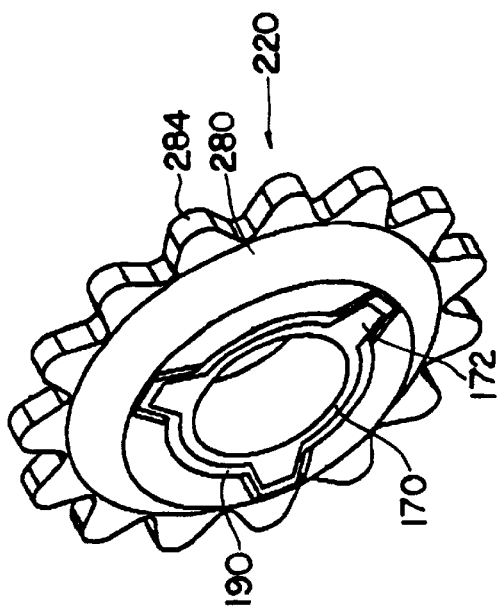
FIG. 5 is a perspective view of a second embodiment of a sprocket of the present invention.
Figure 7:
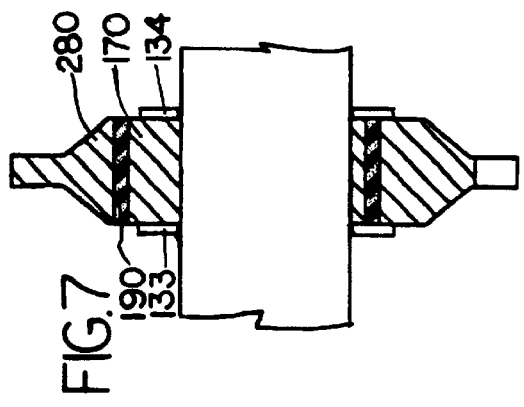
FIG. 7 is a cross-sectional view of the sprocket of FIG. 6 along lines 7—7.
Figure 6:
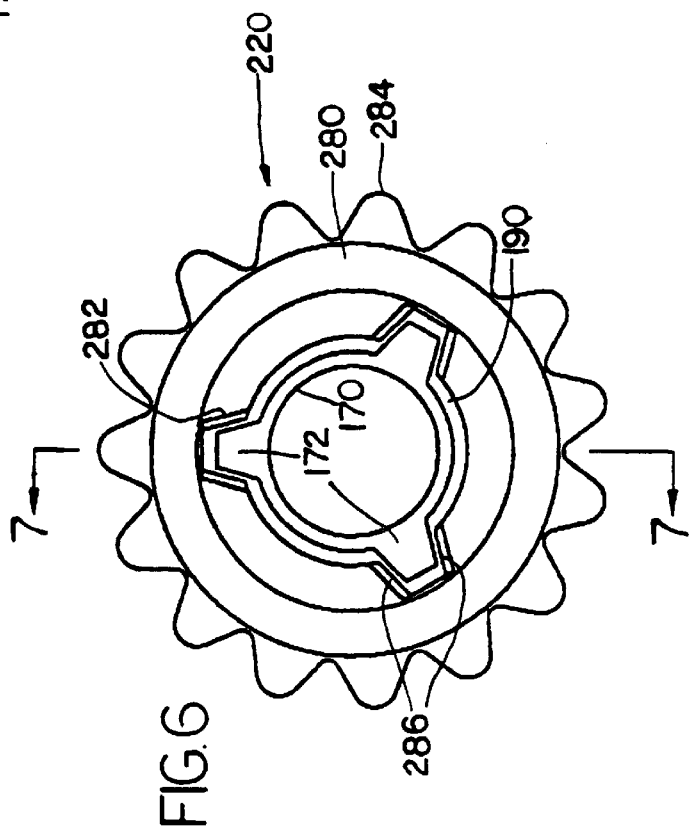
FIG. 6 is a side view of the sprocket of FIG. 5.

FIGS. 5–7 show various views of a second embodiment of the sprocket of the present invention. This compliant sprocket is similar in function to the sprocket illustrated in FIGS. 2–4. In particular, the hub portion 170 and elastomeric member 190 are the same as that illustrated in the previous figures. The rim portion 280, however, consists of a single one-piece element. The rim portion 280 has a ring-like form with a row of teeth 284 centered on the outer periphery of the ring.

Position stops 286 are formed on both sides of the keyways 282 along the inner surface of the rim portion 280 of the sprocket 220. In operation, the stops 286 engage an adjacent surface on the splines 172 to prevent over rotation of the rim portion 280 with respect to the hub 170. Washers 133, 134 are located on each side of the sprocket to help the outer rim portion maintain alignment over the hub and maintain the sprocket alignment with the sprockets of the balance shafts. One of the washers may be spring biased to apply a force to the sprocket and additional damping without restricting the ability of the rim to move with respect to the hub.

The rubber compound forming the elastomeric member is preferably selected such that the natural frequency of the sprocket is about halfway between 0 RPM and the idle speed of the engine. The rubber compound can be changed to alter the stiffness and the torsional isolation provided by the compliant balance shaft sprocket. The inherent damping factor provided by the rubber compound effectively dissipates the energy of vibrations originating from the crankshaft.

In a first embodiment of the method of making the compliant sprocket shown in FIGS. 1–7, the hub and rim portions are formed of metal, placed into an injection mold and held in place with a gap therebetween. A moldable rubber is injected into the mold into the gap between the hub and rim portions.

The sprocket portions and rubber elastomeric portion is preferably heated together in the mold or optionally heated after removal from the mold. Heating causes the rubber elastomeric portion to become cured or vulcanized and effectively bonds the hub and rim portions together. After curing and cooling, the compliant sprocket is removed from the mold and may be assembled into the drive system.

In a second embodiment of the above method, the elastomeric portion is preformed. The hub, elastomeric portion and rim are assembled together to form a complete compliant sprocket. After assembly, the compliant sprocket may be assembled into the drive system.

Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims.

What is claimed is:

1. An engine balance shaft drive comprising:

an engine crankshaft having a compliant crankshaft sprocket disposed thereon;

at least one balance shaft having a balance shaft sprocket disposed thereon;

a chain drivingly engaging said crankshaft sprocket and said balance shaft sprocket;

said compliant crankshaft sprocket having a hub portion secured to said crankshaft and a rim portion, said hub portion having a plurality of radially extending splines, said rim portion located radially about said hub portion and having an inner surface with keyways positioned and adapted to receive said radially extending splines, a plurality of spaced teeth on an outer periphery of said sprocket rim adapted for engagement with said chain;

an elastomeric member disposed between said sprocket hub portion and said sprocket rim portion, said elastomeric member being located between said keyways and said splines to form a compliant member therebetween, said compliant member acting to absorb torsional vibrations from said crankshaft and minimize transmittal of said vibrations through said chain to said balance shaft.

2. The engine balance shaft drive of claim 1 further comprising:

a second balance shaft having an associated sprocket disposed thereon and drivingly engaging said chain; and an idler shaft having an idler sprocket disposed thereon and drivingly engaging said chain, said idler sprocket positioned between said crankshaft sprocket and said second balance shaft sprocket along said chain so that said first balance shaft rotates in a first direction and said second balance shaft rotates in a direction opposite that of said first direction.

3. The engine balance shaft drive of claim 1 wherein said sprocket rim portion includes a sleeve portion and a toothed plate portion, said toothed plate portion being offset to one side of said sleeve portion.

4. The engine balance shaft drive of claim 1 wherein said sprocket rim is formed in a single piece.

5. The engine balance shaft drive of claim 1 wherein said keyways contain a plurality of position stops, each of said position stops being adapted to contact an adjacent face of said splines when said sprocket rim portion rotates more than a predetermined amount relative to said hub portion.

6. The engine balance shaft drive of claim 1 wherein said splines contain a plurality of position stops, each of said position stops of said splines adapted to contact an adjacent face of said keyways when said sprocket rim portion rotates more than a predetermined amount relative to said hub portion.

7. The engine balance shaft drive of claim 1 wherein said elastomeric material is inserted between said sprocket rim and said hub portion by injection molding.

* * * * *